(12) United States Patent
Dettbarn

(10) Patent No.: US 10,240,341 B2
(45) Date of Patent: Mar. 26, 2019

(54) FIRE-RESISTANT WOODEN I-JOIST

(71) Applicant: PinkWood Ltd., Calgary, Alberta (CA)

(72) Inventor: Richard Dettbarn, Calgary (CA)

(73) Assignee: PinkWood Ltd. (CA)

( * ) Notice: Subject to any disclaimer, the term of this patent is extended or adjusted under 35 U.S.C. 154(b) by 0 days.

(21) Appl. No.: 15/342,548

(22) Filed: Nov. 3, 2016

(65) Prior Publication Data

US 2017/0121965 A1    May 4, 2017

Related U.S. Application Data

(60) Provisional application No. 62/380,798, filed on Aug. 29, 2016, provisional application No. 62/321,336, filed on Apr. 12, 2016, provisional application No. 62/250,909, filed on Nov. 4, 2015.

(51) Int. Cl.
| | |
|---|---|
| *E04B 1/94* | (2006.01) |
| *C09D 5/18* | (2006.01) |
| *C09K 21/02* | (2006.01) |
| *E04C 3/14* | (2006.01) |
| *E04C 3/28* | (2006.01) |
| *E04B 5/12* | (2006.01) |
| *E04C 3/18* | (2006.01) |
| *E04C 3/29* | (2006.01) |

(52) U.S. Cl.
CPC .............. *E04B 1/944* (2013.01); *C09D 5/185* (2013.01); *C09K 21/02* (2013.01); *E04B 1/945* (2013.01); *E04B 5/12* (2013.01); *E04C 3/14* (2013.01); *E04C 3/18* (2013.01); *E04C 3/28* (2013.01); *E04C 3/29* (2013.01)

(58) Field of Classification Search
CPC ........................................................ E04C 3/14
See application file for complete search history.

(56) References Cited

U.S. PATENT DOCUMENTS

| | | | | |
|---|---|---|---|---|
| 3,849,963 A | * | 11/1974 | Harmon ................... | E04C 3/14 52/847 |
| 4,336,687 A | * | 6/1982 | Morgan ................. | B62D 5/097 60/384 |
| 5,443,894 A | * | 8/1995 | Pollock .................... | B32B 7/02 428/213 |
| 5,972,467 A | | 10/1999 | Washo | |
| 7,124,544 B2 | * | 10/2006 | Brown .................. | E04B 1/2604 52/264 |
| 7,827,763 B2 | * | 11/2010 | Brown ...................... | E04B 5/12 52/264 |
| 8,458,971 B2 | * | 6/2013 | Winterowd .............. | E04B 1/94 52/232 |
| 8,561,373 B1 | | 10/2013 | McDonald | |
| 8,910,455 B2 | | 12/2014 | Yang | |
| 2014/0245696 A1 | * | 9/2014 | Anderson ................ | E04C 3/29 52/837 |
| 2015/0020476 A1 | | 1/2015 | Winterowd et al. | |
| 2015/0052838 A1 | | 2/2015 | Ritchie et al. | |

* cited by examiner

*Primary Examiner* — Patrick J Maestri
(74) *Attorney, Agent, or Firm* — St. Onge Steward Johnston & Reens LLC

(57) ABSTRACT

This application relates to I-joists which are configured to resist fire damage. Specifically, the present application relates to reinforcing I-joists with reinforcing members configured to provide structural support and/or to provide a physical barrier to fire. This may help the I-joists to maintain structural integrity during a fire and so help improve safety during evacuation of a building and during fire-fighting operations.

22 Claims, 9 Drawing Sheets

FIRE-RESISTANT WOODEN I-JOIST

FIELD OF THE INVENTION

This application relates to products and methods for improving the fire resistance of I-joists. Specifically, the present application relates to reinforcing I-joists with reinforcing members configured to provide structural support and to provide a physical barrier to fire and/or water. This may help the I-joists to maintain structural integrity during a fire and so help improve safety during evacuation of a building and during fire-fighting operations.

BACKGROUND OF THE INVENTION

Various jurisdictions are interested in ensuring that the fire-resistance of newly constructed buildings meets minimum safety requirements as it relates to the construction and occupancy of buildings. Importantly, by improving the fire-resistance of a building, not only can the risk of starting a fire within the building be diminished but also, in the event that a fire is started, the speed of propagation of the fire may also be diminished. In addition to improving fire-resistance, it is desirable to ensure that if a fire does occur, the building maintains structural integrity for a longer period of time not only to allow safe egress for the occupants but also to allow firefighters to move through the building safely for a longer period of time.

The majority of new homes in North America are constructed using wood frame construction in which standard dimension lumber is used to create a frame of the building that is subsequently used to support other components of the building including roofing, windows, insulation, interior and exterior sheathing etc. Jurisdictional building codes typically require that framing lumber has been dried to a specified moisture content according to various engineering standards and protocols so as to minimize or reduce subsequent warping or twisting of the lumber as it dries out over time. As a result of the drying processes that such lumber is subjected to, the lumber frame of a typical building is combustible such that, in the event that a fire is initiated, the relative dryness of the lumber contributes to the rapid combustion and propagation of a fire.

During the 1970's the wood I-Joist was introduced to the North American Housing industry, primarily for use in floors of residential homes. The use of the product was expanded over time to include certain applications in roof systems and in commercial structures. There were many advantages of the "engineered floor joist". The physical properties were superior to dimensional lumber (such as 2×10's and 2×12's), and the quality of the manufactured joist was far more consistent than the quality of dimensional lumber. The introduction of the I-Joist enabled builders to span greater distances without the use of supporting columns. The joists were manufacturing with kiln dried lumber which would not be prone to shrinkage when installed, and helped to eliminate creaking as was the case with dimensional lumber. These advantages contributed to the wide-spread use of the I-Joist by the North American housing industry.

However, despite the many advantages of the I-Joist, it was soon discovered that there was a weakness. In the event of a fire, the web (typically ⅜" OSB) would burn through in about 5 minutes. This meant that in about 5 minutes, there was no connection between the upper flange and the lower flange, and the I-Joist lost its structural integrity. The solid-sawn 2×10 and 2×12 (the previous standard) would take close to 15 minutes to burn through. As the use of I-Joists in floors became the norm in residential housing, many Fire Fighters who arrived at burning homes and entered the house more than 5 minutes after the fire started, would fall through the floor, suffering serious injury or loss of life. Similarly, residents in a home with I-Joists installed in the main floor would awake during a fire, and while trying to evacuate, would make their way down from the second floor, only to fall through the floor on the main level. For many years, the North American Fire Fighters have been lobbying Building Code officials to address the fire hazard posed by wood I-Joists.

In 2012, the International Residential Code was changed to address the issue of fire safety when wood I-Joists are used in residential housing.

The Code requires that when wood I-Joists are used in residential housing, one of the following three conditions must be met:
1. The house must equipped with a sprinkler system, or
2. The basement must be finished, to protect the underside of the I-Joists with a layer of drywall, or
3. The joists must be protected to perform "equivalently" to the previously used 2×10 in the event of a fire.

Equivalent floor performance to 2×10s is defined in ASTM D5055 and by the evaluation agency (I.C.C.-E.S. or I.A.P.M.O.) Essentially, an I-Joist must be able to maintain 50% of its load carrying capability for a period of 15 minutes in a floor assembly fire test.

Structural floor systems are often constructed using I-joists which are manufactured from a top and bottom flange (typically 2" by 3" or 2" by 4" lumber) that are interconnected by a rectangular web (typically ⅜") that extends between the top and bottom flanges and is set within opposing grooves within the top and bottom flanges. The web is typically an oriented strand board (OSB). In a typical I-joist, the assembled height of the I-joist is 9.5" or 11⅞" inches and the length may be any typical lumber length such as 10, 12, 14, 16 feet long. An !-joist can be cut to length on site by the builder.

In some instances coatings may be added to the I-joist to enhance the fire-resistance of the I-joist. In particular, intumescent coatings may be applied during the I-joist manufacturing process that coat the wood and provide resistance to fire. Ideally, a fire-resistance I-joist will lengthen the time it will take for the structural integrity of the I-joist to degrade during a fire thereby extending the time that occupants and/or fire fighters may move across a floor without a floor collapsing.

I-joists are typically used relatively early in the construction framing process in that they form part of the structural floor system of a building and as such are put in place before the roof of the building is constructed. As such, an I-joist is subject to local weather conditions until the roof is framed. The intumescent coatings that are used to provide fire-resistance, while water-resistant, in some circumstances could be affected by long periods of exposure to heavy rain during construction. For example, if a structural floor system was put in place and the building site was exposed to two weeks of heavy rain, in such circumstances, it is possible that the fire-resistance properties of the I-joist could be compromised.

As a result, some building codes require that manufacturers demonstrate that the fire rated coating is not compromised by lengthy exposure to water.

For example, to satisfy the durability test outlined in ICC-ES Acceptance Criteria 14 (AC14) an I-joist must be able to provide a certain level of fire resistance after three cycles of a 24 hour water immersion test. Under this standard, a coated I-joist is immersed in water for 24 hours, dried and then subjected to a fire test. Depending on the fire coating's water solubility, certain coatings may result in the I-joist not meeting the fire-resistance test. In view of the foregoing, there has been a need for improved I-joists structural floor systems that have good fire-resistance and help meet the fire-resistance and weather resistance standards of new building codes.

SUMMARY OF THE INVENTION

In accordance with the present disclosure, there is provided a wooden I-joist comprising:
a first flange;
a second flange positioned opposite to the first flange;
a web spanning between the first flange and the second flange, such that each of the first and second flanges protrude laterally away from the web; and
at least one reinforcing member configured to span between facing surfaces of the first and second flanges, wherein each reinforcing member encloses at least a portion of the outer surface of the web.

A wooden I-joist may be considered to be an I-joist wherein at least one of the flanges and/or the web comprises wood or wood fibers (e.g. oriented strand board).

The reinforcing member may be connected directly to each of the facing surfaces, for example, by a respective fastener such as a nail, staple or screw. The reinforcing member may be connected directly to the web. A fastening substance such as glue may also be used.

The reinforcing member may comprise wood. The reinforcing member may comprise wood fibers (e.g. oriented strand board). The reinforcing member may be formed of the same material as the flange and/or as the web.

The reinforcing member may be coated with an intumescent coating. An intumescent may comprise a substance that swells as a result of heat and/or fire exposure. It will be appreciated that the coating of the reinforcing member may be heat-resistant and/or fire-resistant. It will be appreciated that any coating of the reinforcing member may not comprise flammable components.

There may be a gap between the facing surface and the closest surface of a reinforcing member coated with intumescent coating, the intumescent coating being configured to fill the gap when expanded as a result of heat and/or fire exposure. That is, the reinforcing member may be configured such that the reinforcing member abuts the facing surfaces (e.g. the reinforcing member being cut to the height of the exposed web) and/or such that the reinforcing member abuts the facing surfaces in response to being exposed to heat and/or fire (e.g. the reinforcing member being cut smaller than the height of the exposed web and being coated with an expandable intumescent coating).

The I-joist may comprise at least one pair of reinforcing members, each pair of reinforcing members comprising two reinforcing members located on opposite sides of the web at the same axial position along the I-joist.

Adjacent reinforcing members may be positioned to be at most 54 inches (140 cm) apart along the axis of the I-joist.

The reinforcing members may be connected to the facing surfaces of the first and second flanges using nails or screws.

The reinforcing members may be connected to the facing surfaces of the first and second flanges using one or more of: nails; staples; screws; toenails; skewed nails; and skewed screws.

The reinforcing members may be connected to the facing surfaces of the first and second flanges using nails which penetrate through the flange into the reinforcing member through the respective facing surface.

A pair of reinforcing members may be attached with screws (or nails) through the (wide) face of the flange opposite to the facing surface and into the reinforcing members. The screws may be parallel in direction to the reinforcing members and web.

The pair of reinforcing members may be connected to each other using one or more nails or screws which penetrate through the web.

The sides of the web may be at least partially covered with a layer, wherein the layer comprises one or more of: a fire-resistant layer; and a moisture-resistant layer.

The reinforcing members may be at least partially covered with a layer, wherein the layer comprises one or more of: a fire-resistant layer; and a moisture-resistant layer.

The flanges may be at least partially covered with a layer, wherein the layer comprises one or more of: a fire-resistant layer; and a moisture-resistant layer.

A fire-resistant layer or a moisture-resistant layer may be applied as a liquid (e.g. a coating).

The dimensions and materials of the web, the flanges, the reinforcing members and any fire and moisture resistant layer are configured such that the I-joist satisfies ICC-ES acceptance Criteria 14 or I.A.P.M.O.

The flange may be formed of a "2×4" board. A "2×4" board may have dimensions of approximately 1½ by 3½ inches (~40 mm×90 mm).

Each reinforcing member may be substantially cuboid-shaped (e.g. block-shaped).

The axial length of the reinforcing members may be greater or equal to the height of the web between the facing surfaces.

The reinforcing members may be configured not to protrude laterally away from the web farther than the first and second flanges.

The flanges may be formed from 2"×4" lumber.

According to a further aspect, there is provided a kit of parts comprising:
a first flange;
a second flange positionable opposite to the first flange;
a web configured to span between the first flange and the second flange such that each of the first and second flanges protrude laterally away from the web; and
at least one reinforcing member configured to span between facing surfaces of the first and second flanges, wherein each reinforcing member encloses at least a portion of the outer surface of the web.

The kit of parts may comprise:
an unreinforced I-joist comprising the first and second flanges connected to the web; and
the at least one reinforcing member configured to span between and be connected directly to facing surfaces of the first and second flanges According to a further aspect, there is provided a method of manufacture comprising:
inserting a I-joist into a building under construction, the I-joist comprising:
a first flange;
a second flange positioned opposite to the first flange;
a web configured to span between the first flange and the second flange, such that each of the first and second flanges protrude laterally away from the web; and
connecting at least one reinforcing member such that the at least reinforcing member spans between, facing surfaces of the first and second flanges, wherein each reinforcing member encloses at least a portion of the outer surface of the web.

A roof or temporary protection from rain may be provided over the inserted I-joist prior to connecting the at least one reinforcing member, the roof configured to prevent precipitation from falling on the inserted I-joist. It will be appreciated that, in some embodiments, the reinforcing members are connected to the I-joist prior to installing the I-joist in the floor assembly. The I-joists may form part of an assembly which forms part of one or more of: a floor and a ceiling.

The method of manufacture may be of a floor and/or ceiling construction of a building.

The method may comprise treating a wood substrate to impart fire-resistance to the wood substrate, the method comprising:
 a. coating a fire-resistant composition as described herein on a lumber substrate; and,
 b. allowing the coating to dry.

The coating step may comprise applying any one of or a combination of spray, dip or brush coating.

In accordance with a further embodiment, there is provided a wooden I-joist comprising:
 a first flange;
 a second flange positioned opposite to the first flange;
 a web spanning between the first flange and the second flange, such that each of the first and second flanges protrude laterally away from the web; and
 multiple pairs of spaced-apart reinforcing members, wherein each reinforcing member is a wooden reinforcing member configured to span between facing surfaces of the first and second flanges and enclose at least a portion of the outer surface of the web.

A wooden reinforcing member may be considered to be a reinforcing member which is formed from unreformed wood (e.g. cut from trees) or engineered wood comprising wood fibers (e.g. oriented strand board).

It will be appreciated that spaced-apart may be considered to mean that there are gaps between successive reinforcing members on each side. The reinforcing members may be regularly spaced along the length of the I-joist (e.g. equal gaps between successive reinforcing members).

According to a further aspect, there is provided an assembly comprising multiple I-joists as described above and at least one layer, the layer configured to cover and span between the multiple I-joists.

The layers may comprise one or more of the following: a wooden sub-floor configured to overlay the I-joists; a layer of concrete; a layer of gypsum (or drywall). It will be appreciated that the assembly may comprise only a single layer of gypsum because the I-joists may be more resistant to fire due to the reinforcing member construction.

BRIEF DESCRIPTION OF THE DRAWINGS

The invention is described with reference to the drawings in which.

DETAILED DESCRIPTION OF THE INVENTION

In accordance with the present disclosure, I-joists are described. The I-joists described herein comprise reinforcing members configured to help improve structural integrity of the I-joists (particularly during a fire).

A standard, unprotected I-Joist may fail during a fire because the web, which connects the top flange to the bottom, burns through quickly (e.g. in approximately 5 minutes). The I-Joist is further degraded as the top and bottom flanges continue to burn after the web has burned through, and are weakened until there is no load carrying capability.

In embodiments of the present disclosure, the top and bottom flanges may have more mass (utilizing 2×4s instead of 2×3s). In addition, the top flange is connected to the bottom flange by a specifically designed, proprietary system of reinforcing members (e.g. blocks of wood or OSB), installed at certain intervals along the I-Joists, to bolster the connection of the top flange to the bottom flange and/or to protect and reinforce the web. The reinforcing members may be treated with an intumescent, proprietary, fire resistant paint. For example, intumescent paint is used on OSB panel products to separate buildings where combustible cladding is used (like vinyl siding). The intumescent paint may comprise hydrates, sodium silicates and/or graphite. The intumescent paint on the web may provide 15 minute fire separation as well as reduces the ability of the flame to spread (e.g. ASTM E-84 Class A rating, and in addition to the structural effect of the reinforcing members, they shield the web between the reinforcing members from the fire, maintaining the structural connection of the top flange to the bottom flange provided by the web. The reinforcing members may be specifically cut approximately 1/16" small on each end so they can be easily inserted between the flanges. During a fire the intumescent coating expands to fill this 1/16" gap so to resist heat and flame from degrading the web. In the full scale floor assembly fire test, it is shown that embodiments of the modified I-Joists installed with the reinforcing members, will exceed the equivalency requirements mandated by the 2012 IRC Section R501.3.

In the present disclosure, the specific modifications, method of manufacture, and method of installation describe how to help improve resistance to failure in the event of a fire for an I-joist, and thereby help meet or exceed the requirements of Section R501.3 of the 2012 IRC.

I-Joist Example 1

Figure 1A:
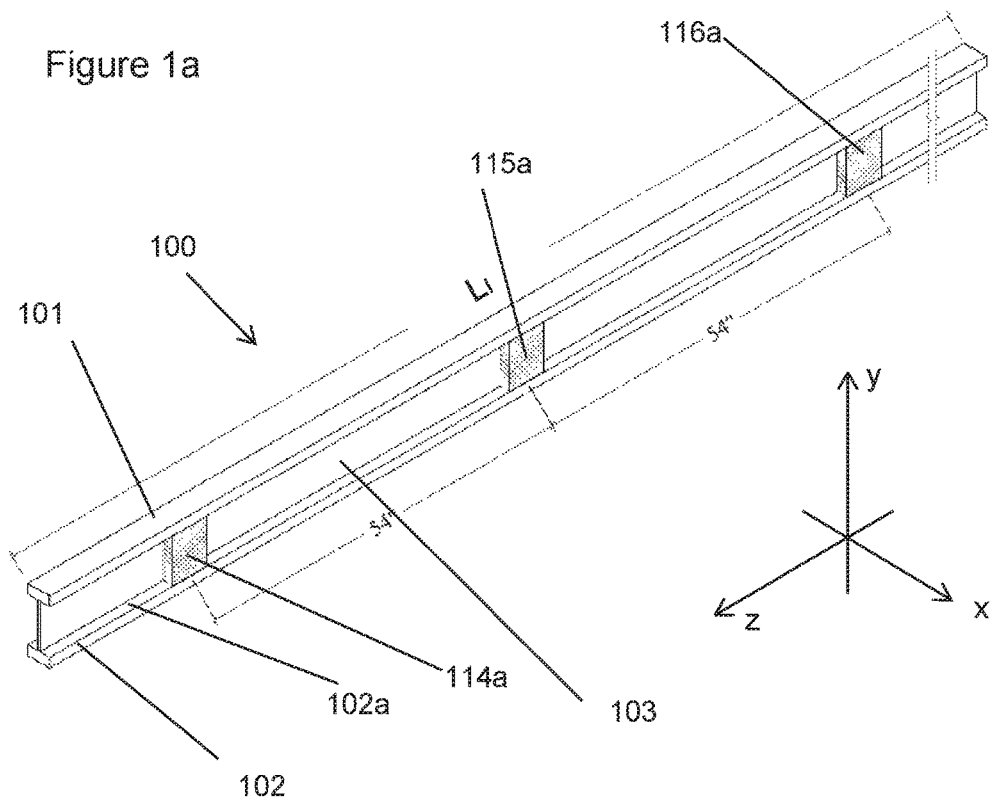
FIGS. 1a and 1b is a side view and cross-section of a first embodiment of an I-joist.
Figure 1B:
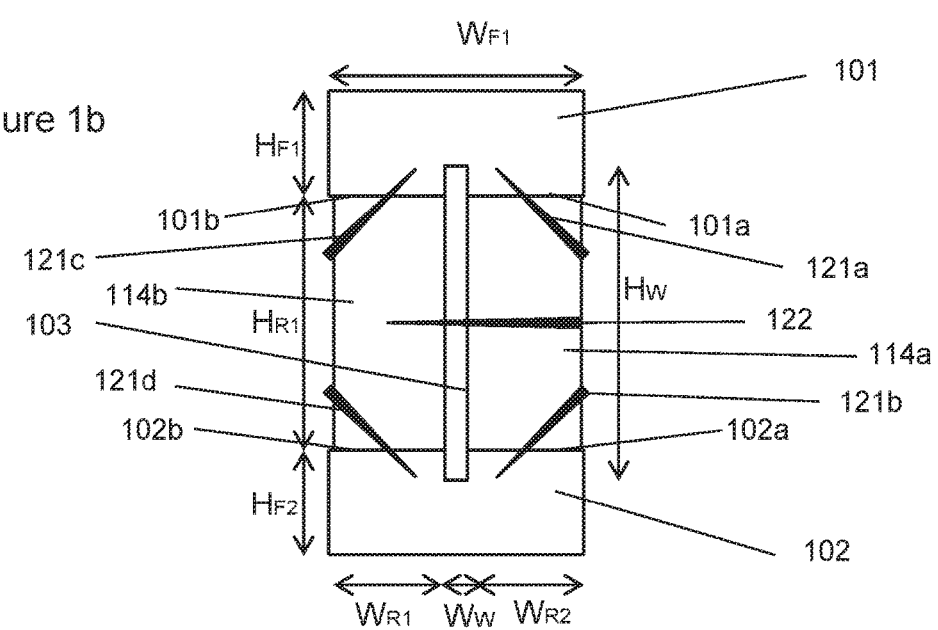

As shown in FIG. 1a and FIG. 1b, according to a first embodiment of the present disclosure, there is provided a wooden I-joist 100 comprising:
 a first flange 101;
 a second flange 102 positioned opposite to the first flange 101;

a web 103 spanning between the first flange and the second flange, such that each of the first and second flanges protrude laterally away from the web; and at least one reinforcing member 114a, 115a, 116a configured to span between, and be connected directly to, facing surfaces 101a, 102a; 101b, 102b of the first and second flanges 101, 102, wherein each reinforcing member encloses at least a portion of the outer surface of the web.

The reinforcing member may enclose at least a portion of the outer surface of the web by being configured such that an inner surface of the reinforcing member abuts an outer surface of the web. It will be appreciated that the area of the outer surface of the web enclosed may span between the first and second flanges 101, 102.

Coordinate System

For the purposes of this disclosure, the axis of along the I-joist 100 is the z-axis. The length of a particular component will correspond to the dimension along this z-axis. The axis perpendicular to the web surface is the x-axis. The width of a particular component will correspond to the dimension along this x-axis. The axis perpendicular to the x-axis and to the z-axis is the y-axis. The height of a particular component will correspond to the dimension along this y-axis. This is shown in FIG. 1a.

Materials

In this embodiment, the first flange 101 and the second flange 102 are made of wood. In particular, the first and second flanges are made of SPF Lumber, which comprises wood from spruce, pines and/or fir trees. In this case, the first and second flanges 101, 102 are wooden boards with a substantially rectangular cross section. In each of the first and second flanges 101, 102, one surface comprises a groove configured to receive the web 103.

In this embodiment, the web 103 is formed from oriented strand board (OSB). It will be appreciated that in other embodiments, the web 103 may be formed from wood or other processed wood fibres (e.g. plywood).

In this case the dimensions of the first and second flanges 101, 102 are the same. It will be appreciated that in some embodiments, the first flange 101 may have different dimensions to the second flange 102. For example, the height and/or width of the first flange 101 may be greater or less than the corresponding dimension of the second flange 102.

In this case, each of the reinforcing members 114a, 115a, 116a comprises wood.

In this case, the reinforcing members are coated with a proprietary fire resistant intumescent paint. The intumescent paint serves two purposes: it helps slow the burning of the reinforcing member itself, and as the intumescent paint is heated, it expands (e.g. as a cellular foam) and seals any crack (or gap) between the reinforcing member and the top and bottom flange. This seals the web from the heat and flames, protecting the integrity of the web situated behind the reinforcing member.

Construction

In this case, the reinforcing members are arranged in spaced-apart pairs 114a, 114b, each pair of reinforcing members comprising two reinforcing members located on opposite sides of the web at the same axial position along the I-joist 100. That is, the reinforcing member pairs 114a, 114b are arranged such that at least a portion of the web 103 is enclosed on opposing sides by the reinforcing members. This may help ensure that this portion of the web 103 is protected on both sides from water and/or fire. Spacing the reinforcing members apart along the axis of the I-joist may allow the overall weight of the I-joist to be reduced.

When the I-joist is being constructed, the web 103 is inserted into the grooves in the first and second flanges 101, 102 and glued. That is, in this case, the web is connected to the flanges with glue. It will be appreciated that the groove may or may not be positioned in the middle of the width of the first and second flanges 101, 102.

Each reinforcing member in this case is connected to the respective facing surfaces 101a, 102a; 101b, 102b of the first and second flanges 101, 102 by one or more fasteners 121a-d. In this case, each reinforcing member is connected directly to the first and second flanges by a toenail 121a-d (or skewed nail) which is driven from an exposed surface of the reinforcing member 114a, 114b, through the reinforcing member at an angle and into the flange 101, 102.

In addition, in this example, the pair of reinforcing members 114a, 114b are connected to each other using one or more fasteners 122 (nails in this case) which penetrate through the web 103.

Dimensions

In this case, the width of the web 103, $W_W$, is approximately 0.39 inches (~1 cm). The height of the web 103, $H_W$, may be different in different embodiments. In this case, the height of the web is 6.5 inches (~16.5 cm). The length of the web is related to the length of the I-joist, $L_I$, which may be dependent on the application. For example, an I-joist may have a length of more than 14 feet (~4.3 m)

In this case, the width of the first and second flanges 101, 102, $W_{F1}$, $W_{F2}$ is around 3.5 inches (~9 cm). The height of the first and second flanges 101, 102, $H_{F1}$, $H_{F2}$ is around 1.5 inches (~4 cm). That is, the first and second flanges 101, 102 are formed from "2×4" boards. It has been found that using "2×4" flanges may help satisfy the test described in ASTM E119 section 8.6 (Edition approved May 1, 2011. Published May 2011; DOI: 10.1520/E0119-11). The length of the first and second flanges is related to the length of the I-joist, $L_I$, which may be dependent on the application.

In this case, each reinforcing member 114a, 114b, 115a, 116a is substantially cuboid-shaped (e.g. block-shaped).

The height of the reinforcing member 114a, 114b, 115a, 116a corresponds to the height of the web 103 between the facing surfaces. That is, when in place, the reinforcing member 114a, 114b, 115a, 116a simultaneously abuts the inner surfaces of both the first and second flanges.

In this case, the length of the reinforcing member 114a, 114b, 115a, 116a is less than the height of the reinforcing member. It will be appreciated that, in other embodiments, the length of the reinforcing member 114a, 114b, 115a, 116a may be greater or equal to the height of the reinforcing member (e.g. the height of web between the facing surfaces).

In this case, the width of the reinforcing members 114a, 114b, 115a, 116a is around 1.5 inches (~4 cm). That is, in this case the width of the reinforcing members 114a, 114b, 115a, 116a is less than the width of the facing surfaced on the first and second flanges. This means that, when in place, the reinforcing members 114a, 114b, 115a, 116a are configured not to protrude laterally away from the web farther than the first and second flanges 101, 102.

In this case, adjacent reinforcing members 114a, 115a, 116a (e.g. reinforcing member pairs) are positioned to be 54 inches (140 cm) apart along the axis of the I-joist. It will be appreciated that, in other embodiments, adjacent reinforcing members may be positioned closer together or farther apart. It has been found that positioning the reinforcing members at most 54 inches (140 cm) apart along the axis of the I-joist may help satisfy the test described in ASTM E119 section 8.6.

In some embodiments, a reinforcing member 115a or reinforcing member pair is positioned at the mid-point along the length of the I-joist. The other reinforcing members or member pairs are, in this case, positioned with respect to this central reinforcing member or reinforcing member pair.

Coatings

The wooden I-joist may comprise a fire-resistant layer and/or a moisture-resistant layer (e.g. in the form of a coating).

In this case, the sides of the web and the reinforcing members are at least partially covered with a layer, wherein the layer comprises a fire- and moisture-resistant layer. In this case, the layer is a coating applied at a 3-4 mm wet film thickness.

In this case, the flanges are not covered although it will be appreciated that in other embodiments, the flanges may be covered with a fire-resistant layer and/or a moisture-resistant layer. It will be appreciated that some coating run-off from the application process may be expected on the flanges.

Alternative Fastener Configurations

Figure 2A:
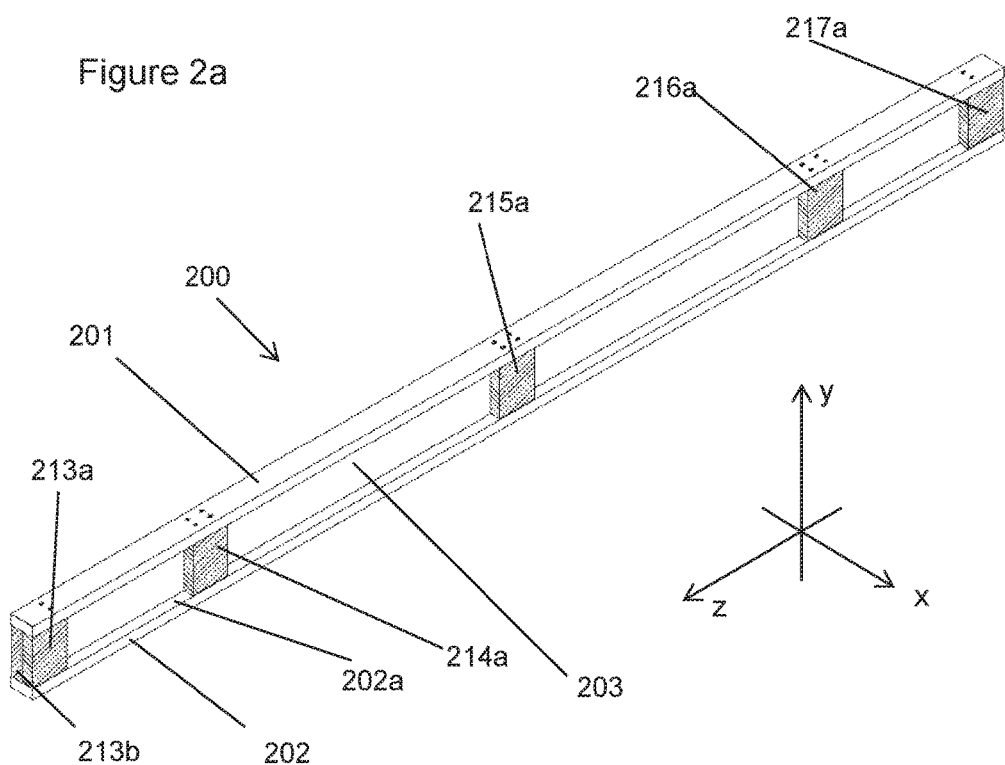
FIGS. 2a and 2b is a side view and cross-section of a second embodiment of an I-joist.
Figure 2B:
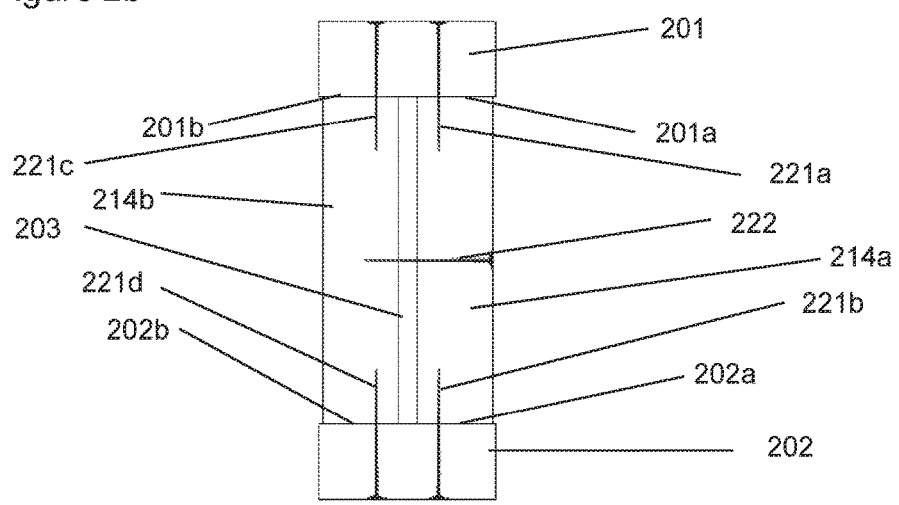

As shown in FIG. 2a and FIG. 2b, according to a second embodiment of the present disclosure, there is provided a wooden I-joist 200 comprising:

a first flange 201;

a second flange 202 positioned opposite to the first flange 201;

a web 203 spanning between the first flange and the second flange, such that each of the first and second flanges protrude laterally away from the web; and at least one reinforcing member 214a, 215a, 216a configured to span between, and be connected directly to, facing surfaces 201a, 202a; 201b, 202b of the first and second flanges 201, 202, wherein each reinforcing member encloses at least a portion of the outer surface of the web.

The reinforcing member may enclose at least a portion of the outer surface of the web by being configured such that an inner surface of the reinforcing member abuts an outer surface of the web. It will be appreciated that the area of the outer surface of the web enclosed may be configured to substantially span between the first and second flanges 201, 202 (e.g. before a fire, or after a fire has expanded any intumescent coating).

The second embodiment is similar to the first embodiment in most respects. However, unlike the previous embodiment, in this embodiment, each reinforcing member in this case is connected to the respective facing surfaces 201a, 202a; 201b, 202b of the first and second flanges 201, 202 by one or more fasteners 221a-d in a different way. In this case, each reinforcing member is connected directly to the first and second flanges by nails 221a-d which are driven from an exposed surface of the flange 201, 202 into the reinforcing member 214a, 214b. The exposed surface is on the opposite side of the flange to the facing surfaces.

In this case, reinforcing members (or filler blocks) will be installed at mid-span, every 4½' (maximum) from mid-span, and at the joist ends. Mid-span 615 and intermediate 614, 616 reinforcing members (excluding end reinforcing members 613, 616) are secured, in this case, to the upper and lower flanges with two 2½" subfloor screws at the top and bottom of each element on each side of the joist. These screws are to be installed through the face of the top and bottom flanges. Reinforcing members at I-joist ends will be secured with one 2½" subfloor screw at the top and bottom on each side of the joist. A single 2½" subfloor screw to be installed through the face of each reinforcing member will fasten the two opposing 2×6 reinforcing members to the web.

As in the first embodiment, pairs of reinforcing members 214a, 214b are connected to each other using one or more fasteners 222 (nails in this case) which penetrate through the web 203.

In addition, in this case, there are additional end reinforcing members 213a-b, 217a positioned at each end of the I-joist.

Alternative Block-Type

Figure 2C:
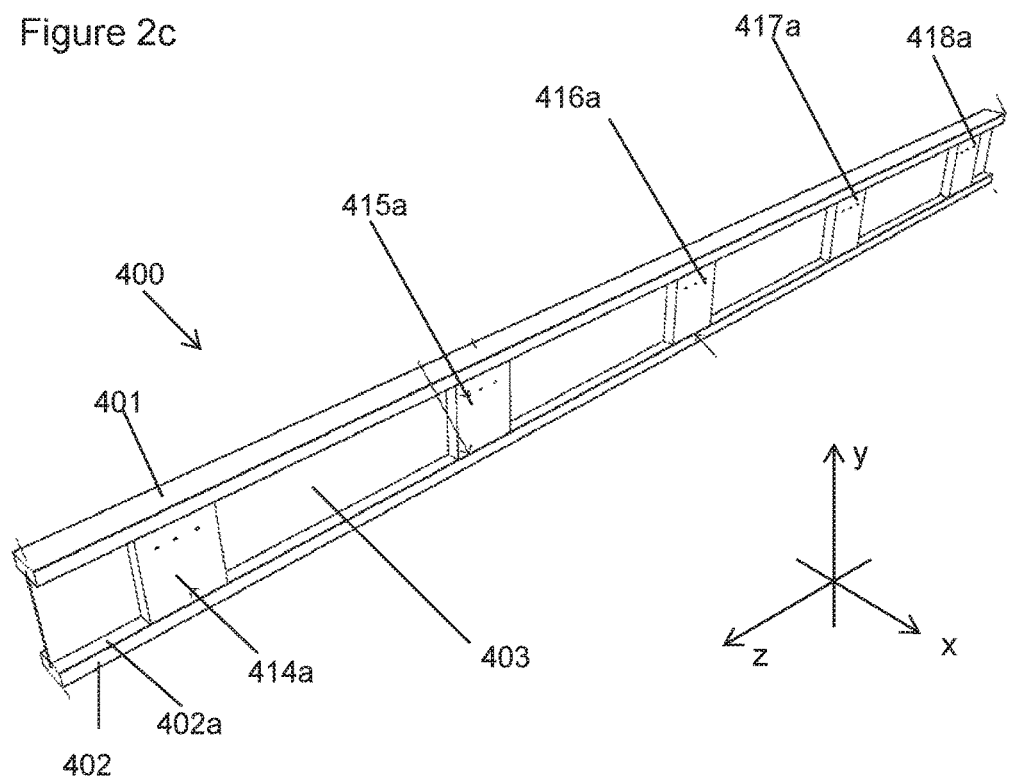
FIGS. 2c and 2d is a side view and cross-section of a further embodiment of an I-joist.
Figure 2D:
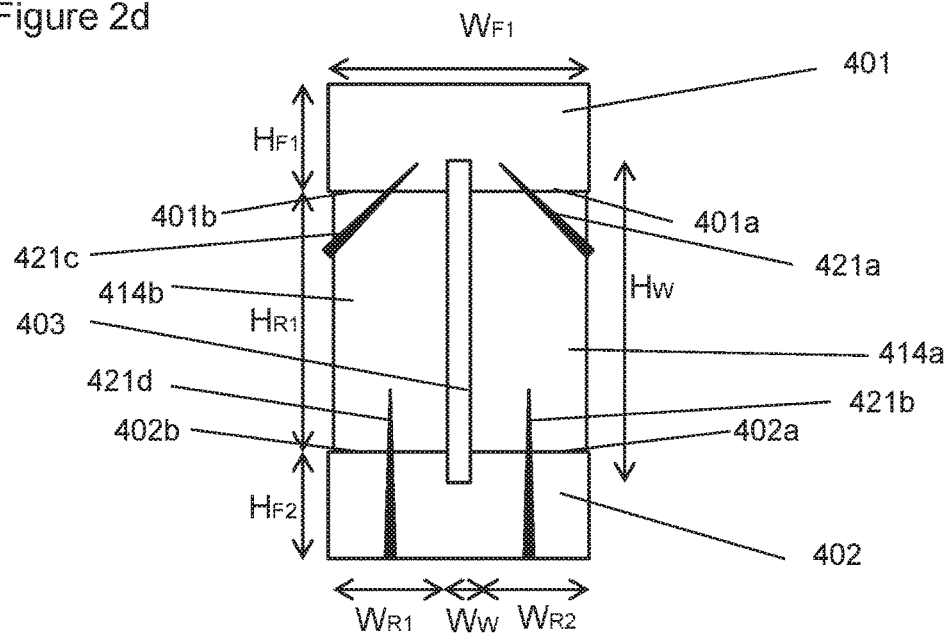

As shown in FIG. 2c and FIG. 2d, according to a third embodiment of the present disclosure, there is provided a wooden I-joist 400 comprising:

a first flange 401;

a second flange 402 positioned opposite to the first flange 401;

a web 403 spanning between the first flange and the second flange, such that each of the first and second flanges protrude laterally away from the web; and at least one reinforcing member 414a, 415a, 416a, 417a, 418a configured to span between facing surfaces 401a, 402a; 401b, 402b of the first and second flanges 401, 402, wherein each reinforcing member encloses at least a portion of the outer surface of the web.

The reinforcing member may enclose at least a portion of the outer surface of the web by being configured such that an inner surface of the reinforcing member abuts an outer surface of the web. It will be appreciated that the area of the outer surface of the web enclosed may be configured to substantially span between the first and second flanges 401, 402 (e.g. before a fire, or after a fire has expanded any intumescent coating).

The second embodiment is similar to the first embodiment in most respects. However, unlike the previous embodiment, in this embodiment, each reinforcing member in this case is connected to the respective facing surfaces 401a, 402a; 401b, 402b of the first and second flanges 401, 402 by one or more fasteners 421a-d in a different way. In this case, the reinforcing members are connected directly to the second flange by 3½ inch (#10) flat head wood screws 421b, 421d which are driven from an exposed surface of the flange 401, 402 into the reinforcing member 414a, 414b. The exposed surface is on the opposite side of the flange to the facing surfaces. In this case, each reinforcing member is connected directly to the first flange by 3½ inch (#10) flat head wood screws 421a, 421c which are driven from an exposed surface of the reinforcing member 414a, 414b, through the reinforcing member at an angle and into the flange 401. It will be appreciated that other fasteners (e.g. nails or other screw types) may be used.

In this case, the block size and configuration is different. In this case, the reinforcing members (or filler blocks) are "2×8" blocks of wood which are installed at mid-span, every 3 feet from mid-span (e.g. including one at mid-span).

As in the first embodiment, pairs of reinforcing members 414a, 414b may or may not also be connected to each other using one or more fasteners (not shown) which penetrate through the web 403.

A floor based on this embodiment was tested following the test methodology described in ASTM E119, "Standard test methods for fire tests of building and construction materials" and AC14, "Acceptance criteria for prefabricated wood I-joists". It was found that the reinforcing members compensated for the web being burned in order to maintain structural load. Some of the calculations for this test are shown in the "Calculations of Parameters for Second Fire Performance Test" section below.

Floor Construction: Example 1

Figure 3:
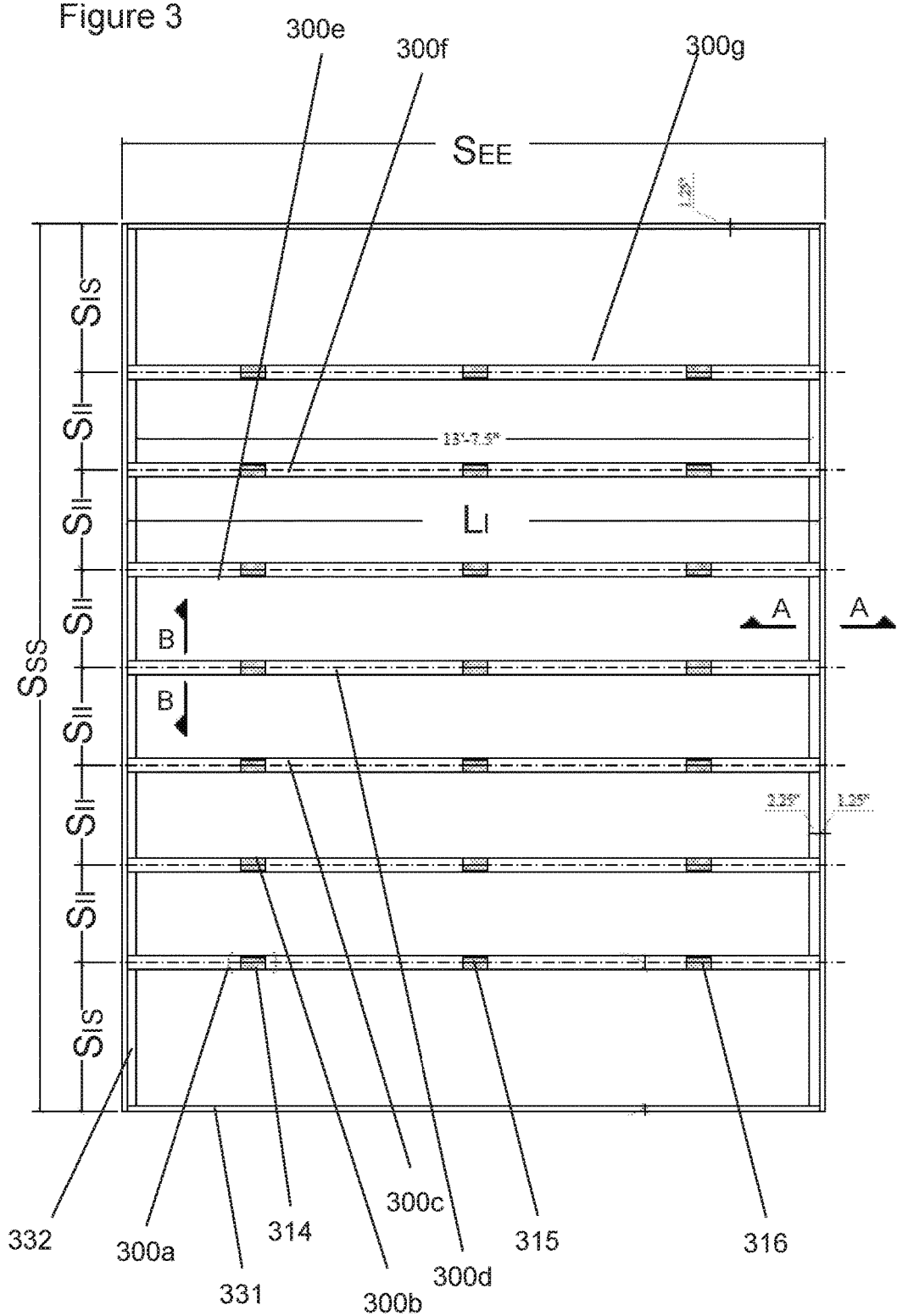
FIG. 3 is an overhead plan of a floor construction comprising I-joists.

FIG. 3 is a plan view of a floor construction comprising the I-joists 300a-g described in relation to the first embodiment. In this case, the floor is rectangular with a two opposing edges and two opposing sides. In this case, the joists 300*a-g* are configured to span between the opposing edges (and are arranged parallel to two opposing sides). In this case, the edges are longer than the sides. It will be appreciated that in other embodiments, the edges may be the same or smaller than the sides. The side-to-side distance, $S_{SS}$, in this case is 18 feet (5.5 m). The edge-to-edge distance, $S_{EE}$, in this case is 14 feet 2.5 inches (4.3 m).

In this case, the distance between the centres of adjacent I-joists 300*a-g*, $S_{II}$, is 2 feet (~60 cm). The distance between the closest I-joist 300*a*, 300*g* to a side wall and the side wall is greater than the inter I-joist distance. In this case, the distance between the closest I-joist and the side wall is 3 feet (~90 cm). In this case, seven I-joists 300*a-g* are used for this subfloor.

Each I-joist 300*a-g* in this example comprises three pairs of reinforcing members (e.g. 314, 315, 316). One of the reinforcing member pairs (e.g. 315) is located centrally between the two edges (e.g. halfway along the axis of the I-joist).

Figure 4:
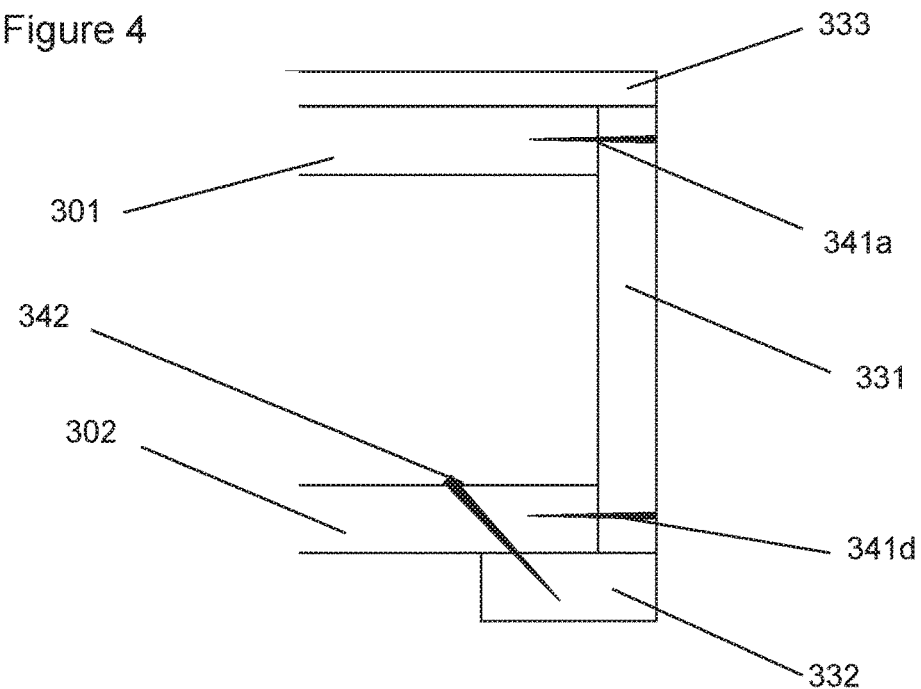
FIGS. 4 and 5 are cross sections of the floor construction of FIG. 3.
Figure 5:
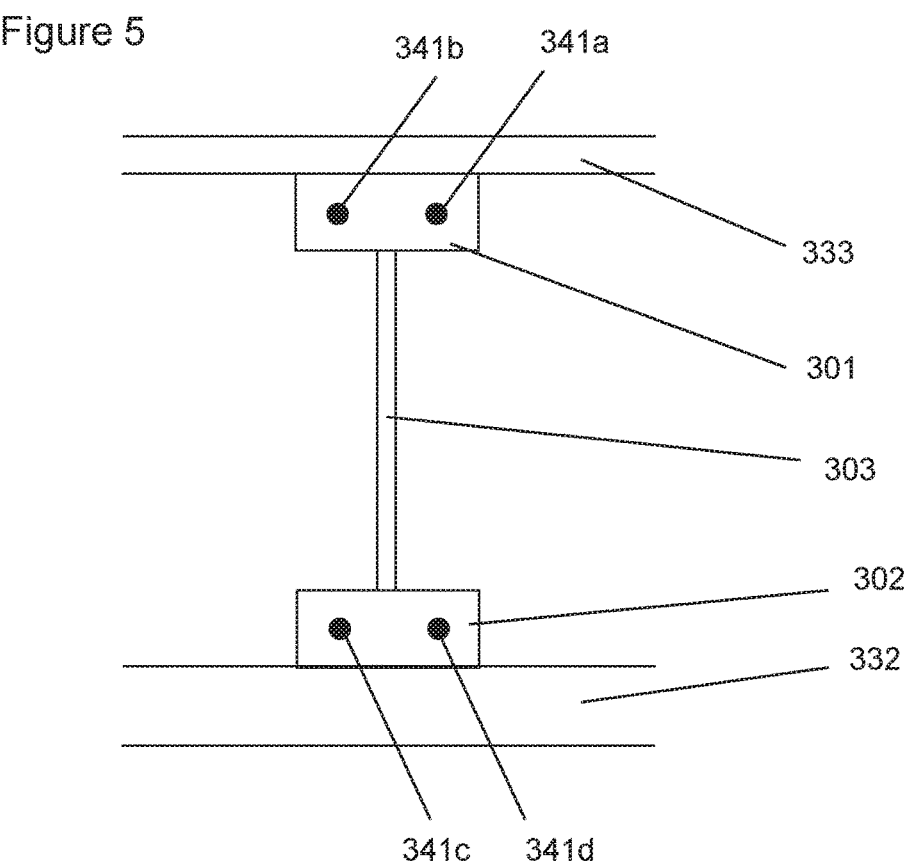

In this case, the ends of the joists are placed on "2×4" bearing plates 332. This is more clearly shown in FIG. 4 which is a cross-section view through section A-A in FIG. 3; and in FIG. 5 which is a cross-section view through section B-B in FIG. 3. In this case, the I-joists are fastened to the bearing plates with fasteners 342. In this case, the fasteners 342 comprise two 10d (3" or 7.5 cm) nails, one toe nailed through the face of the flange on each side of the web.

In addition, rim boards 331 are used to close both sides and edges of the assembly around the perimeter. Each end of the I-joists is fastened to the rim board 331 with fasteners 341*a-d*, which in this case are two 8d (2½" or 6.4 cm) nails on both the top and bottom flanges. The bottom of the rim board is fastened to the bearing plate around the perimeter with fasteners, which are in this case with 8*d* (2½" or 6.4 cm) nails at 6" on centre.

The subfloor layer 333 in this case comprises a single layer of ²³/₃₂" (nominal ¾" or 2 cm) thickness Tongue and Groove (T&G) oriented strand board (OSB) placed over the joists with the 8' (2.4 m) long edges positioned at right angles to the joists. The subfloor is connected to framing members using 8d nails at 6" on centre spacing at joints and 8" on centre for the construction site.

In this case, the subfloor 333 is constructed by first installing unreinforced I-joists in the floor. Once the floor area has been covered such that precipitation cannot reach the I-joists (e.g. by installing a roof on the building), the reinforcing members are installed. This means that if the reinforcing members are covered with a layer (e.g. a coating) which is fire resistant but not moisture resistant, the layer material may be protected from rain or other precipitation. In addition, other fire resistant materials may be applied after the floor area has been covered. For example, any remaining exposed area of the web may be provided with a layer of drywall (e.g. comprising gypsum plaster). For example, a layer of drywall may be attached to each side of the exposed web using fasteners (e.g. nails, screws and/or staples). The drywall may comprise fiberglass or vermiculite which may improve fire-resistant properties.

Floor Construction: Example 2

Figure 6:
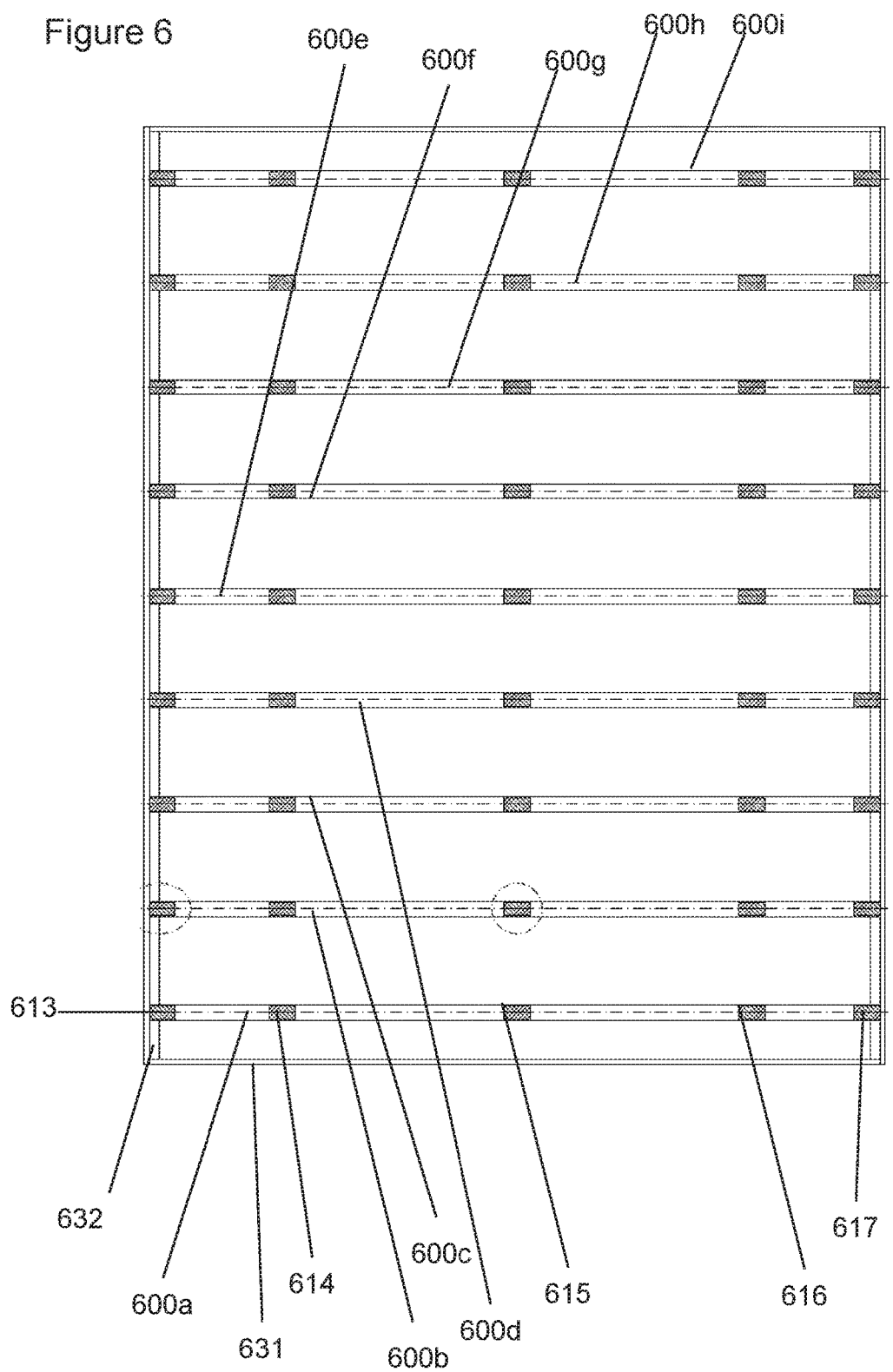
FIG. 6 is an overhead plan of a floor construction comprising I-joists.

As shown in FIG. 6, in a second embodiment, the subfloor may be constructed using I-joists of the second embodiment (FIGS. 2*a* and 2*b*). In this case, the arrangement of the I-joists in the floor may be similar to that described in relation to FIG. 3.

The side-to-side distance, $S_{SS}$, in this case is 18 feet (5.5 m). The edge-to-edge distance, $S_{EE}$, in this case is 14 feet 2.5 inches (4.3 m).

In this case, the distance between the centres of adjacent I-joists 600*a-i*, $S_{II}$, is 2 feet (~60 cm). The distance between the closest I-joist 600*a*, 600*i* to a side wall and the side wall is less than the inter I-joist distance. In this case, the distance between the closest I-joist and the side wall is 1 foot (~30 cm). In this case, nine I-joists 600*a-i* are used for this subfloor.

Each I-joist 600*a-i* in this example comprises four pairs of reinforcing members (e.g. 613-617). One of the reinforcing member pairs (e.g. 315) is located centrally between the two edges (e.g. halfway along the axis of the I-joist).

Figure 7:
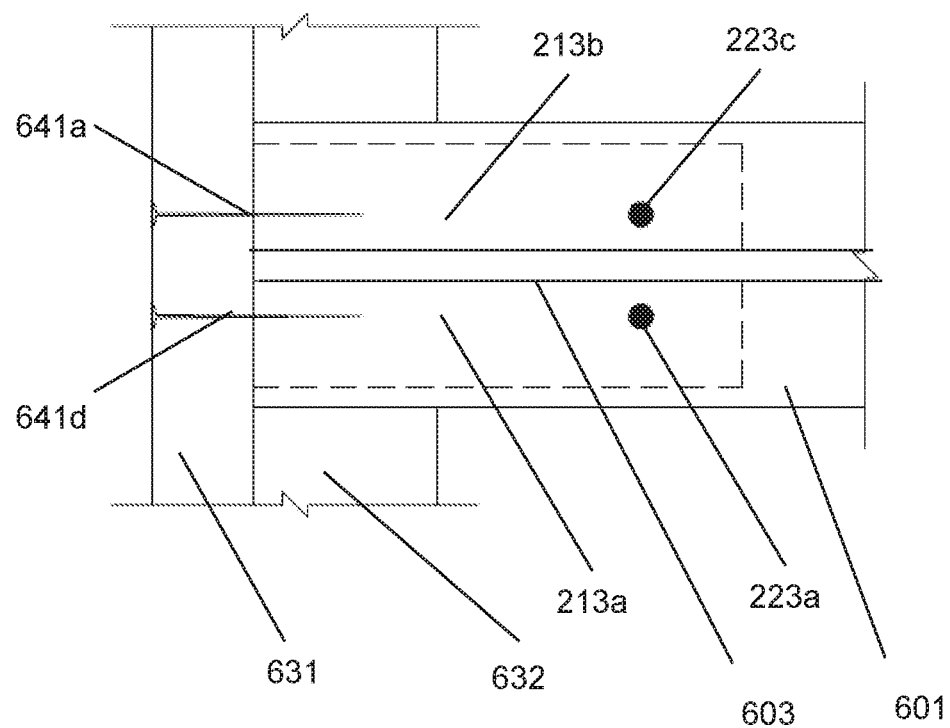
FIG. 7 is a cross-section of the floor construction of FIG. 6.

In this case, the end reinforcing members allow the rim board 631 in a different way as shown in FIG. 7.

In this case, the ends of the joists are placed on "2×4" bearing plates 632. In addition, rim boards 631 are used to close both sides and edges of the assembly around the perimeter. Each end of the I-joists is fastened to the rim board 631 with fasteners 641*a,d*, which in this case are two 8d (2½" or 6.4 cm) nails nailed to the end reinforcing members 613*a,b*. As described above, the end reinforcing members are connected in this case to the flanges by fasteners 223*a,c* which are nailed through the flange 601 and into the reinforcing members 213*a,b*.

Although the present invention has been described and illustrated with respect to preferred embodiments and preferred uses thereof, it is not to be so limited since modifications and changes can be made therein which are within the full, intended scope of the invention as understood by those skilled in the art.

Alternative Reinforcing Member

Figure 8A:
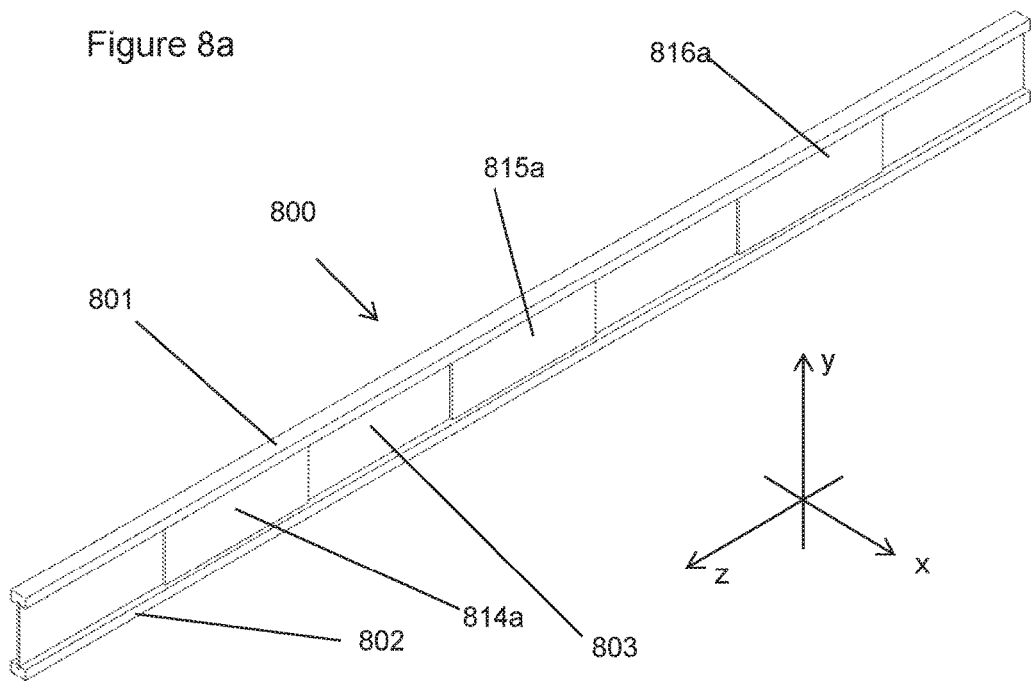
FIGS. 8a and 8b is a side view and a cross-section of a further embodiment of an I-joist.
Figure 8B:
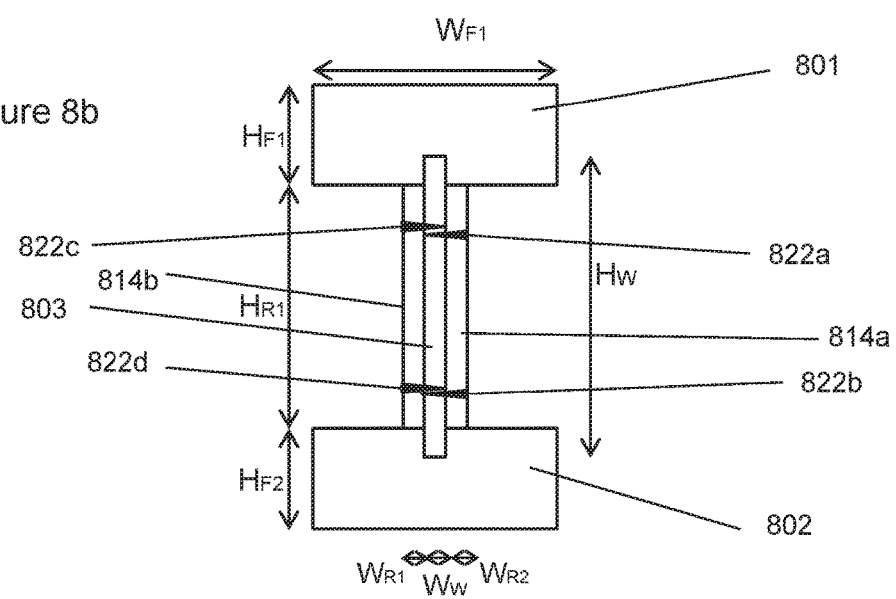

As shown in FIG. 8*a* and FIG. 8*b*, according to a further embodiment of the present disclosure, there is provided a wooden I-joist 800 comprising:

a first flange 801;

a second flange 802 positioned opposite to the first flange 801;

a web 803 spanning between the first flange and the second flange, such that each of the first and second flanges protrude laterally away from the web; and at least one reinforcing member 814*a*, 815*a*, 816*a* configured to span between facing surfaces 801*a*, 802*a*; 801*b*, 802*b* of the first and second flanges 801, 802, wherein each reinforcing member encloses at least a portion of the outer surface of the web.

The reinforcing member may enclose at least a portion of the outer surface of the web by being configured such that an inner surface of the reinforcing member abuts an outer surface of the web. It will be appreciated that the area of the outer surface of the web enclosed may be configured to substantially span between the first and second flanges 801, 802 (e.g. before a fire, or after a fire has expanded any intumescent coating).

As in previous embodiments, the reinforcing members in this case are arranged in pairs wherein a particular portion of the web 801 is enclosed on both sides by members of a pair (e.g. reinforcing members 814*a*, 814*b*)

The second embodiment is similar to the first embodiment in most respects. However, in this case, the reinforcing members are not blocks of wood but rectangular layer portions of OSB (which is the same material as the web in this case). In this case, the length of each reinforcing members is 2 feet and the distance between adjacent reinforcing members is also 2 feet. The thickness of the reinforcing members, $W_{R1}$, $W_{R2}$, is ⅜ inches, which in this case, is the same thickness as that of the web, $W_W$. In this case, the web is painted (e.g. with proprietary and/or intumescent paint). The reinforcing members are painted in this case with intumescent paint (e.g. around 14 mil or 0.4 mm wet). The thickness of the layer portions (e.g. $W_{R1}$, $W_{R2}$) may be less than ½ inch.

In addition, the flanges in this embodiment are 2×3 boards (other embodiments may have 2×4 boards).

In addition, in this embodiment, each reinforcing member in this case is connected directly to the web by ¾ inch staples 822a-d which are driven from an exposed surface of the reinforcing members 814a, 815a, 816a and into the web 803. The exposed surface is on the opposite side of the flange to the facing surfaces.

In this case, reinforcing members (or filler blocks) will be installed at mid-span, every 4 foot (maximum) from mid-span.

As in the first embodiment, pairs of reinforcing members 814a, 814b are connected to the web using one or more fasteners 822a-d (nails in this case) which penetrate into the web 203.

It will be appreciated that the width of the OSB reinforcing members may be different in some embodiments (e.g. the reinforcing members may have a width greater than ⅜" such as 7/16").

I-joists as described above may form part of a floor/ceiling assembly. In multi-family construction building codes may require a minimum of 60 minute fire separation between units (or apartments). A "floor/ceiling assembly" forms the ceiling of one apartment and the floor of the apartment above. A conventional "floor/ceiling assembly" is typically made up of the following:

I-joists—standard with no reinforcing members;
A subfloor covering and spanning between the I-joists;
Light weight concrete poured on top of the subfloor;
Insulation (3½") (this component is optional)—the insulation provides sound reduction performance and thermal insulation;
Resilient channels—these are metal channels that run perpendicular to the joist at typically 16" o/c. The channels again isolate the joist from the gypsum board to provide small pathway for sound to travel.
Gypsum (e.g. in the form of drywall)—two layers of ½"

Figure 9A:
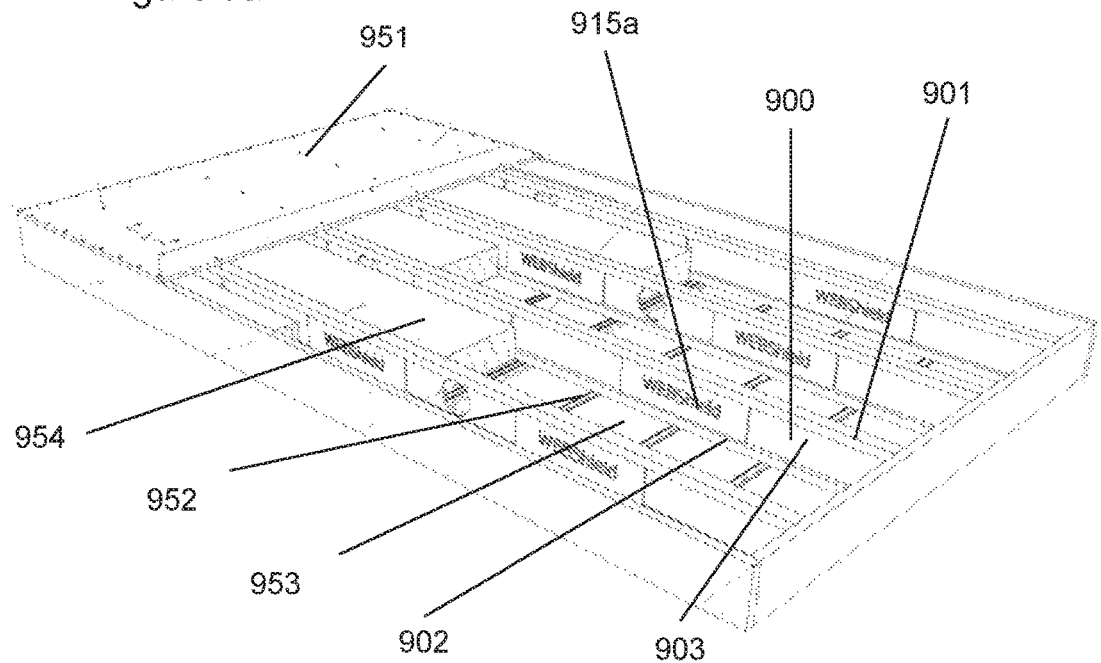
FIGS. 9a and 9b are perspective views of the embodiment of FIG. 8a incorporated into a floor structure.
Figure 9B:
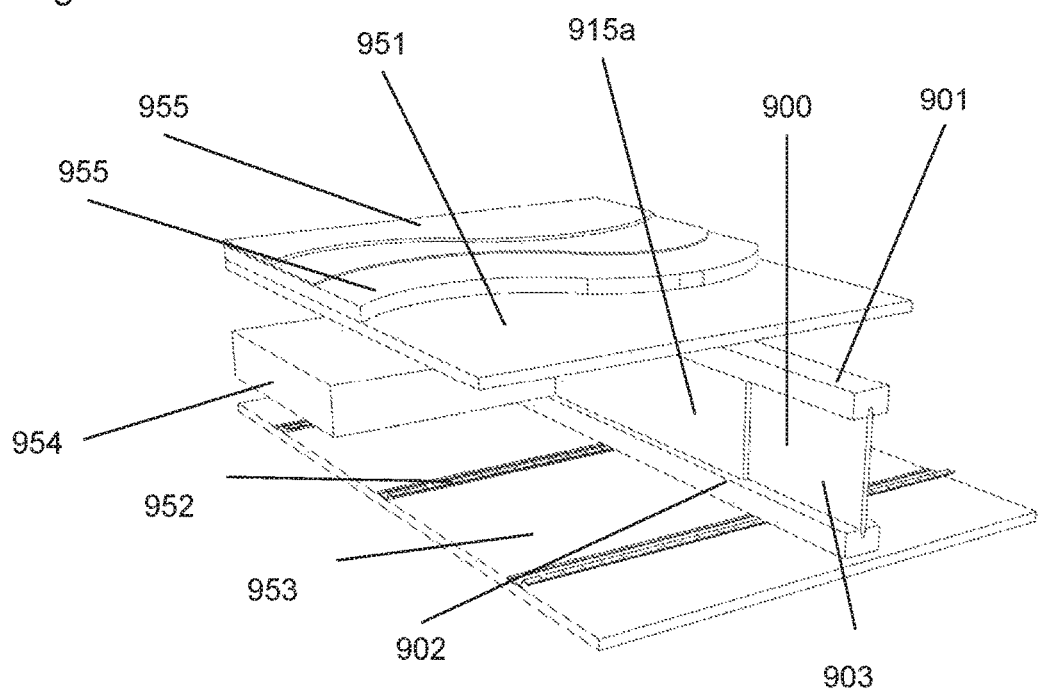

FIGS. 9a and 9b show a floor comprising I-joists according to the present disclosure. As shown in FIG. 9a, the floor assembly in this case comprises:

I-joists 901—each including reinforcing members 915a, a first flange 901; a second flange 902; and a web 903.
A subfloor 951 (e.g. formed form wood) covering and spanning between the I-joists;
Light weight concrete 955 poured on top of the subfloor.
Optional insulation 954 (3½")—the insulation may help provide sound reduction performance and thermal insulation.
Resilient channels 952—these are metal channels that run perpendicular to the joist at typically 16" o/c. The channels again isolate the joist from the gypsum board to provide small pathway for sound to travel.
Gypsum—one layer 953 of ⅝" fire rated gypsum
Optional additional layers 955 (e.g. carpet or wood) overlaid on the concrete layer.

That is, by improving the fire-resistance of the I-joist itself using reinforcing members as described above, the I-joist may require less fire protection from the gypsum (or drywall) layer or layers mounted on the bottom of the floor assembly. That is, the present I-joist may save one layer of ½" drywall (or gypsum) and the labour of installing this additional drywall layer compared with a conventional ceiling/floor assembly.

It will be appreciated that the structure shown in FIGS. 9a and 9b represents one embodiment of the present disclosure. Other embodiment with variations on this structure may also be used. For example, another embodiment may use multiple gypsum layers in conjunction with reinforced I-joists to further increase the fire-resistant properties of the assembly.

Calculations of Parameters for First Fire Performance Test

Appendix 1 Calculation of Load for Equivalent Fire Performance Test (in accordance with A4.4.1.2 of AC14)

1 Construction Details

|   |   | Physical Properties | | |
|---|---|---|---|---|
|   | Joist Type | b (flange width) (in) | d (flange depth) (in) | h (joist height) (in) |
| 1) | 9½ PK35Plus FRI | 3.5 | 1.5 | 9.5 |
| 2) | Clear Span | 13 ft + 7.5 in = 13.63 ft = 163.5 | | |
| 3) | o/c spacing (in): | 24 in | | |
| 4) | Sub-floor: | 23/32" (nominal ¾") OSB | | |

2 Calculation of Full ASD Bending Design Load

End Bearing Length: 2.25 in
Design Span: 13.81 ft = 165.75 in
1) Adjusted design moment Mr'

| Reference Design Value | Load Duration Factor | Wet Service | Temperature Factor | Beam Stability Factor | Repetitive Member Factor | Adjusted Design Value |
|---|---|---|---|---|---|---|
| Mr lbs-ft | $C_D$ | $C_M$ | $C_t$ | $C_L$ | $C_r$ | Mr' lbs-ft |
| 2365 | 1.0 | 1.0 | 1.0 | 1.0 | 1.0 | 2365 |

Note:
Mr' = $MrC_DC_MC_tC_LC_r$

3) Allowable linear joist loading, $W_{Mr'}$ $W_{Mr'} = 8Mr'/L\wedge 2$
$= 99$ plf 4) Allowable uniform area loading, $\omega_{Mr'}$ $\omega_{Mr'} = W_{Mr'}/s$
$= 49.6$ psf 3 50% of full ASD bending design load In fire test, each framing member (I-joist) shall support a load corresponding to 50% of its full ASD bending design lead as following:

In full uniform linear load:

$W = 50\% \ W_{Ma'}$ $= 49.6 \ plf$

Calculations of Parameters for Second Fire Performance Test

Determination of Minimum Fire Test Duration of Solid Sawn 2×10 Floor Joist
(in accordance with A4.4.1.5 of AC14)

1 Physical Properties of 2×10 Before Fire Exposure

|  |  | Physical Properties | | | |
|---|---|---|---|---|---|
| 1) | Joist Type | b (width) (in) | h (height) (in) | A (Area) (in^2) | S (Section Modulus) (in^3) | I (Moment of Inertia) (in^4) |
|  | 2 × 10 | 1.5 | 9.25 | 13.88 | 21.39 | 98.93 |

2) Design Span (L) 13.81 ft = 166 in (same as the I-joist design span)

3) o/c spacing (in): 24 in

4) Species and Grade: S-P-F No2 & better

2 Calculation of Full ASD Bending Design Load

| 1) Adjusted bending design value Fb' | | | | | | | | | |
|---|---|---|---|---|---|---|---|---|---|
| Reference Design | Load Duration | Wet Service Factor | Temperature Factor | Beam Stability Factor | Sizer Factor | Flat Use Factor | Incising Factor | Repetitive Member Factor | Adjusted Design Value |
| Fb psi | $C_D$ | $C_M$ | $C_t$ | $C_L$ | $C_F$ | $C_{fu}$ | $C_i$ | $C_r$ | Fb' psi |
| 875 | 1.0 | 1.0 | 1.0 | 1.0 | 1.1 | 1.0 | 1.0 | 1.15 | 1107 |

2) Allowable bending moment, Ma $Ma = F_b' S$ $= 23677 \ lbs\text{-}in$ $= 1973 \ lbs\text{-}ft$ 3) Allowable linear joist loading, $W_{Ma}$ $W_{Ma} = 8 \ Ma/L^2$ $= 83 \ plf$ 4) Allowable uniform area loading, $\omega_{Ma}$ $\omega_{Ma} = \omega_{Ma}/s$ $= 41.4 \ psf$ 3 50% of the Full ASD Bending Design Load, $\omega$ $\omega = 50\% \ \omega_{Ma}$ $= 20.7 \ psf$ 4 Determination of exposure time, t (min)

$t = \boxed{14.8315} \ minutes$ $= 0.247 \ hrs$ 4.1 Calculation of Effective Char Layer Thickness, $a_{Char}$
Effective Char Rate:

$\beta_{eff} = 1.2 \beta_r / t \wedge 0.187$ $= 1.2 \times 1.5 / t \wedge 0.187$ $= 2.34 \ in./hr$ Effective Char Layer Thickness:

$a_{char} = \beta_{eff} t$ $= 0.58 \ in$ 4.2
Physical Properties of 2/10 after Fire Exposure (Dimension Reduced)—Fire Exposure on Three Sides

| b (width = b − 2$a_{char}$) (in) | h' (height = h − $a_{char}$) (in) | A' (Area) (in^2) | S' (Section Modulus) (in^3) | I' (Moment of Inertia) (in^4) |
|---|---|---|---|---|
| 0.34 | 8.67 | 2.99 | 4.32 | 18.71 |

4.3
Induced Stress Calculated Using Reduced Section Property and 50% of Full Bending Design Load,
$F_{b\text{-}induced}$ 1) Linear Load w'

$$w' = \omega(s/12)$$
$$= 41.38 \; plf$$

2) Induced Moment Under 50% of Full Bending Design Load $$M = w'L \wedge 2/8$$
$$= 986.53 \; lbs\text{-}ft$$

3) Induced Stress Calculated Using Reduced Section Property and 50% of Full Bending Design Load $$F_{b\text{-}induced} = M/S'$$
$$= 2743.04 \; psi$$

4.4 Calculation of Member Strength for Fire Design, $F_{b\text{-}fire}$

| Reference Design Value | Design Strength to Member Strength Factor | Sizer Factor | Volume Factor | Flat use Factor | Beam Stability Factor | Member Strength |
|---|---|---|---|---|---|---|
| $F_b$ psi | 2.85 | $C_F$ | $C_V$ | $C_{fu}$ | $C_L$ | $F_{b\text{-}fire}$ psi |
| 875 | 2.85 | 1.1 | N/A | 1.0 | 1.0 | 2743.13 |

4.5 the Following Condition Must be Met:

$F_{b\text{-}induced} \leq F_{b\text{-}fire}$ i.e.

$F_{b\text{-}fire} - F_{b\text{-}induced} \geq 0$ 4.6 the Maximum Value of t which Meets the Above Condition could be Found Through an Iterative Procedure (Assume the Result is Acceptable when the Difference is within 0.5 Psi)

When $t = 14.8315$ minutes $$F_{b\text{-}fire} - F_{b\text{-}induced} = 2743.13 - 2743.04$$
$$= 0.09 \; psi$$

So,

Minimum fire test duration of equivalent fire test is:

T=14.8 minutes

Calculations of Load for One Hour Layer Fire Test (Based on Assembly of FIGS. 9a and 9b)

1 Construction Details

| | | Physical Properties | | |
|---|---|---|---|---|
| | Joist Type | b (flange width) (in) | d (flange depth) (in) | h (joist height) (in) |
| 1) | 11⅞" PKI20 FRI | 2.5 | 1.5 | 11⅞ |
| 2) | Clear Span | 13 ft + 7.5 in = 13.63 ft = 163.5 | | |
| 3) | o/c spacing (in): | 24 in | | |
| 4) | Sub-floor: | 23/32" OSB Sheathing | | |
| 5) | Insulation: | 3½" fiberglass batt | | |
| 6) | Resilient channel @ 16" o/c | | | |
| 7) | Ceiling: | ⅝" Pabco Type C gypsum board | | |
| 8) | Rim board: | 1¼" LVL | | |

2 Calculation of Full ASD Bending Design Load

End Bearing Length: 2.25 in

Design Span: 13.81 ft=165.75 in

1) Adjusted design moment, Mr'

| Reference Design Value | Load Duration Factor | Wet Service Factor | Temperature Factor | Beam Stability Factor | Repetitive Member Factor | Adjusted Design Value |
|---|---|---|---|---|---|---|
| Mr lbs-ft | $C_D$ | $C_M$ | $C_t$ | $C_L$ | $C_r$ | Mr' lbs-ft |
| 3079 | 1.0 | 1.0 | 1.0 | 1.0 | 1.0 | 3079 |

Note:

Mr' = $MrC_D C_M C_t C_L C_r$

2) Allowable linear joist loading, $W_{Mr'}$ $$W_{Mr'} = 8Mr'/L \wedge 2$$
$$= 129 \; plf$$

3) Allowable uniform area loading, $\omega_{Mr'}$ $$\omega_{Mr'} = W_{Mr'}/s$$
$$= 64.6 \; psf$$

Note:

It is also confirmed that moment is the governing factor for this design.

3 Dead Load of test floor assembly, $\omega_{Dead}$

| | | | Area Calculation | | | Average | |
|---|---|---|---|---|---|---|---|
| Items | Description | Average Mass | Width (ft) | Length (ft) | Area (ft^2) | Mass (lbs/ft) | Length (ft) | Weight-$W_{total}$ (lbs) |
| 1) | 23/32" OSB Sheathing | 2.07 | 8 | 14.21 | 113.67 | | | 235.29 |
| 2) | 3.5" Fiber glass batt | 0.37 | 8 | 14 | 112 | | | 41.59 |
| 3) | Resilient channel @ 16" o/c | | | | | 0.22 | 84 | 18.48 |
| 4) | 5/8" Pabco Type C gypsum board | 2.35 | 8 | 13.63 | 109 | | | 256.15 |
| 5) | 1 1/4" Rim board | | | | | 4.7 | 28 | 131.60 |
| 6) | I-joists | | | | | 3.52 | 56 | 197.12 |
| 7) | Nails | | | | | | | 10.00 |
| | Total | | | | | | | 890.23 |

So, Dead Load of test floor assembly in psf:

$$\omega_{Dead} = W_{total} \div \text{Area}$$
$$= 890.23 \div 112$$
$$= 7.95 \text{ psf}$$

4 Required Superimposed Load for Test Assembly

The required uniform superimposed load applied on test fire assembly for 24" o/c I-joist spacing (in psf of lbs/ft$^2$)

$$\omega_{actual} = \omega_{M_f'} - \omega_{Dead}$$
$$= 64.55 - 7.95$$
$$= 56.6 \text{ psf (lb/ft}^2\text{)}$$

The invention claimed is:

1. A wooden I-joist comprising:
a first flange;
a second flange positioned opposite to the first flange;
a continuous web spanning between the first flange and the second flange, such that each of the first and second flanges protrude laterally away from the web;
multiple pairs of spaced-apart reinforcing members positioned along the length of the continuous web, wherein each reinforcing member is a single planar sheet of oriented strand board configured to span between facing surfaces of the first and second flanges, and enclose at least a portion of the outer surface of the web;
a height of each reinforcing member being no greater than a distance between the facing surfaces of the first and second flanges; and
a combined thickness of each pair of reinforcing members and the web enclosed therebetween being less than a width of the first and second flanges.

2. The wooden I-joist of claim 1, wherein the reinforcing members are coated with an intumescent coating.

3. The wooden I-joist of claim 1, wherein each pair of reinforcing members comprises two reinforcing members located on opposite sides of the web at the same axial position along the I-joist.

4. The wooden I-joist of claim 1, wherein adjacent reinforcing members are positioned to be at most 54 inches (140 cm) apart along the axis of the !-joist.

5. The wooden I-joist of claim 1, wherein the reinforcing members are connected to the facing surfaces of the first and second flanges using nails or screws.

6. The wooden I-joist of claim 1, wherein the reinforcing members are connected to the facing surfaces of the first and second flanges using one or more of: nails; screws; toenails; skewed nails; and skewed screws.

7. The wooden I-joist of claim 1, wherein the reinforcing members are connected to the facing surfaces of the first and second flanges using nails which penetrate through the flange into the reinforcing members through the respective facing surface.

8. The wooden I-joist of claim 3, wherein each pair of reinforcing members are connected to each other using one or more nails or screws which penetrate through the web.

9. The wooden I-joist of claim 1, wherein the sides of the web are at least partially covered with a layer, wherein the layer comprises one or more of: a fire-resistant layer; and a moisture-resistant layer.

10. The wooden I-joist of claim 1, wherein the reinforcing members are at least partially covered with a layer, wherein the layer comprises one or more of: a fire-resistant layer; and a moisture-resistant layer.

11. The wooden I-joist of claim 1, wherein the flanges are at least partially covered with a layer, wherein the layer comprises one or more of: a fire-resistant layer; and a moisture-resistant layer.

12. The wooden I-joist of claim 1, wherein the I-joist is configured to satisfy ICC-ES acceptance Criteria 14 approved in June 2016.

13. The wooden I-joist of claim 1, wherein the reinforcing members are configured not to protrude laterally away from the web farther than the first and second flanges.

14. The wooden I-joist of claim 1, wherein the flanges are formed from 2"×4" lumber.

15. The wooden I-joist of claim 1, wherein at least one reinforcing member is connected directly to the facing surfaces of the first and second flanges.

16. A kit of parts comprising:
a first flange;
a second flange positionable opposite to the first flange;
a continuous web configured to span between the first flange and the second flange such that each of the first and second flanges protrude laterally away from the web; and
multiple pairs of spaced-apart reinforcing members positionable along the length of the continuous web, wherein each reinforcing member is a single planar sheet of oriented strand board configured to span between facing surfaces of the first and second flanges, and enclose at least a portion of the outer surface of the web;

a height of each reinforcing member being no greater than a distance between the facing surfaces of the first and second flanges; and a combined thickness of each pair of reinforcing members and the web enclosed therebetween being less than a width of the first and second flanges.

17. The kit of parts of claim 16, wherein the kit of parts comprises:

an unreinforced I-joist comprising the first and second flanges connected to the web; and multiple reinforcing members configured to span between facing surfaces of the first and second flanges.

18. A method of manufacture comprising:

inserting a I-joist into a building under construction, the I-joist comprising:

a first flange;

a second flange positioned opposite to the first flange;

a continuous web configured to span between the first flange and the second flange, such that each of the first and second flanges protrude laterally away from the web; and thereafter connecting multiple pairs of spaced-apart reinforcing members positioned along the length of the continuous web, such that each reinforcing member is a single planar sheet of oriented strand board configured to span between facing surfaces of the first and second flanges, and encloses at least a portion of the outer surface of the continuous web;

a height of each reinforcing member being no greater than a distance between the facing surfaces of the first and second flanges; and a combined thickness of each pair of reinforcing members and the web enclosed therebetween being less than a width of the first and second flanges.

19. The wooden I-joist of claim 1, wherein:

a length of each reinforcing member is greater than the height thereof.

20. The wooden I-joist of claim 1, wherein:

the combined thickness of each pair of reinforcing members and the web enclosed therebetween is less than one-half a width of the first and second flanges.

21. The wooden I-joist of claim 20, wherein the thickness of each reinforcing member is equal to the thickness of the web.

22. The wooden I-joist of claim 21, wherein the flanges are formed from 2"×4" lumber and the thickness of each reinforcing member is less than ½".

* * * * *